Dec. 19, 1967   S. GREENE   3,358,644

EGG COLORING DEVICE

Filed Oct. 23, 1965

INVENTOR.
SANFORD GREENE
BY
*Briskin & Goldfarb*
ATTORNEYS

United States Patent Office 3,358,644
Patented Dec. 19, 1967

3,358,644
EGG COLORING DEVICE
Sanford Greene, 223 Duck Pond Drive S.,
Wantagh, N.Y. 11793
Filed Oct. 23, 1965, Ser. No. 503,805
2 Claims. (Cl. 118—219)

ABSTRACT OF THE DISCLOSURE

An egg coloring device comprising a frame. A pair of relatively adjustable longitudinally spaced shafts are journalled. Means are provided for securing an egg to be decorated between the shafts. Decorating means resiliently mounted by leaf springs are slidably mounted and are movable toward and away from said longitudinal axis for applying decorating material on an egg.

---

This invention relates to an egg coloring device, and more particularly to a toy for coloring or decorating objects such as Easter eggs in a large variety of patterns and colors.

It is an object of this invention to provide a device for coloring Easter eggs rapidly in selective patterns of stripes, spirals, dots, or any combination of lines or dots of any selected color as desired.

It is another object of the invention to provide a device which can rapidly apply decorative patterns of variously selected colors to Easter eggs or to cylindrical or tubular objects, or to strips of paper which may be unrolled from a cylinder gripped in the device, thus providing amusement during times of the year other than the Easter season.

To these ends, and in accordance with an illustrative embodiment of the invention, a frame is provided in which a pair of longitudinal spaced shafts are journalled on a common longitudinal axis. The outer ends of each of the shafts is provided with a handle for rotating the shaft, and at least one of the shafts is longitudinally displaceable and biased with a spring to urge it toward the other shaft. Holding means, such as a suction cup, are provided at the inner end of each of the shafts, and a plurality of swingable arms are mounted adjacent to each other, above the longitudinal axis of the shafts. The swingable arms are each provided with a reservoir for coloring liquid and an applicator extending downwardly from the reservoir. The arms are biased upwardly, so that manual pressure downwardly on a selected one or more of the arms applies the selected dye from the reservoir onto the surface of the egg or other object being held between the shafts.

The foregoing and other objects, advantages and features of my invention will be apparent from, and will be set forth in detail in the following description in conjunction with the embodiment of an egg coloring device according to the invention illustrated by way of example only in the accompanying drawings, in which.

In the figures, the same numerals designate similar parts throughout the several views.

Figure 1:
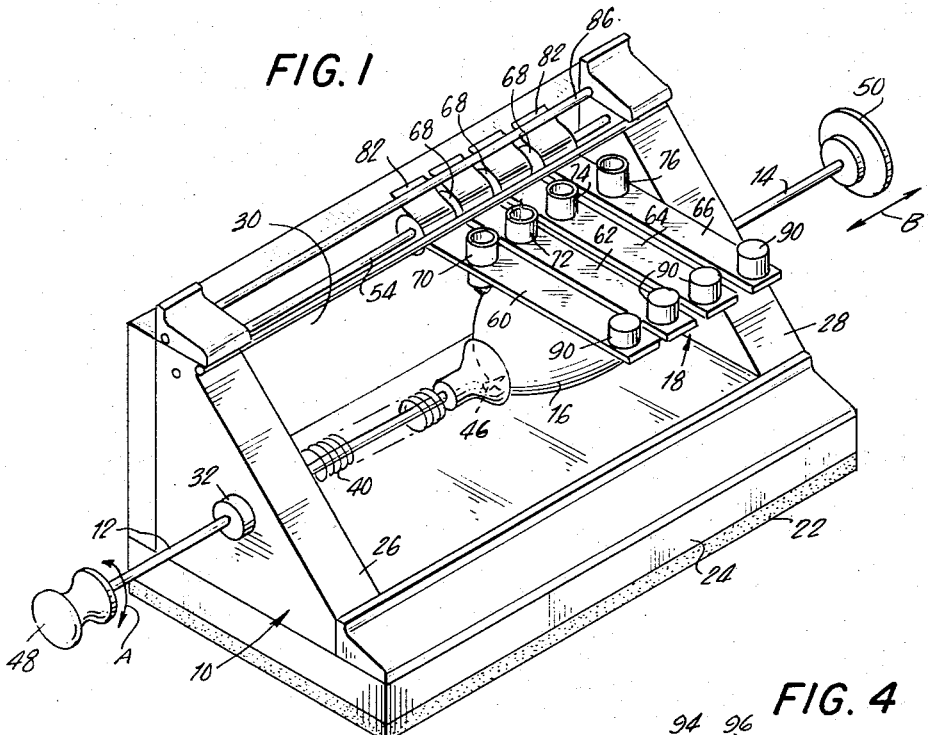
FIG. 1 is a perspective view of the device according to an embodiment of the invention.

With continuing reference to the drawings, the illustrated egg-coloring device comprises a frame, generally designated by the numeral 10, a pair of longitudinal aligned coaxial shafts 12, 14 journalled in the frame 10 and arranged to hold an object 16 to be decorated. Decorating means generally designated by the numeral 18 are mounted within the frame 10 and movable toward and away from the longitudinal axis of shafts 12, 14 for applying decorating material to the object 16.

The frame 10 may be made of plastic, wood, or other suitable material, and in the embodiment shown is provided on the flat bottom surface of its base 24 with a layer 22 of soft sponge material, such as foam rubber, to help prevent sliding of the device on the surface of a table while it is being used. The frame 10 further comprises a pair of upright standards 26, 28 at the respective ends of the base 24 and fastened thereto, and a back member 30. The upper surface of the base 24 is preferably made of or coated with a water-impervious material for ease of cleaning.

Fixed in the upright standards 26, 28 are respective journals or sleeves 32, 34 for supporting the respective shafts 12, 14 in a rotational and axially displaceable manner. The sleeves 32, 34 are coaxially arranged so that the shafts 12 and 14 lie along a common longitudinal axis. A recess 36 is provided in the standard 26 between one end of the sleeve 32 and the inner surface of standard 26 for receiving a washer 38 which surrounds the shaft 12 and rests against one end of sleeve 32 so as to form a thrust surface for a compression spring 40 which surrounds a portion of shaft 12.

Mounted on the inner opposed ends of shafts 12 and 14 are holding means 42, 44, such as suction cups, for supporting the egg or other object 16 to be decorated in position between the shafts 12, 14. The suction cups 42, 44 may be made of soft rubber-like material and have respective cup-shaped surfaces facing each other for engaging the respective ends of the egg 16. In addition to, or instead of, the suction cups 42, 44, a pointed pin 46 may be mounted eccentrically on the inner end of the shaft 12 for engaging and applying a rotational torque to rotate the object 16 when the shaft 12 is manually rotated. The outer end of shaft 12 is provided with a knob for rotation of the shaft 12 together with the object 16 in either or both rotational directions indicated by the arrow A. The outer end of shaft 14 is provided with a knob or push-button 50 for manual axial displacement of shaft 14 together with object 16 and shaft 12 toward the left relative to FIG. 2 in opposition to the longitudinal compressive force of spring 40, which tends to urge the object 16 together with its holding means 42, 44 toward the right against a thrust washer or thrust surface 52 within the standard 28. Shaft 14 is thus movable in both directions as indicated by the arrow B (FIG. 1), and also rotatable within the sleeve or journal 34.

Figure 3:
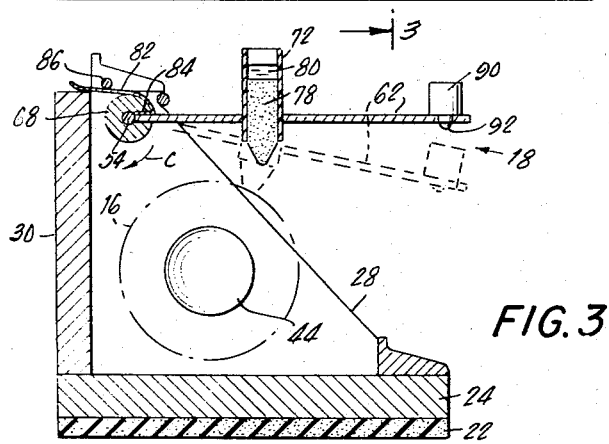
FIG. 3 is a vertical sectional view taken along the plane of line 3—3 of FIG. 2.

The decorating means 18 will now be described. A rod 54 extending between the standards 26, 28 and parallel to the longitudinal axis of shafts 12 and 14 is provided with a plurality of mounting members in the form of swingable arms 60, 62, 64, 66, each having an enlarged cylindrical portion 68 at one end through which extends respective through-bores for sliding and swinging motion of each arm about the rod 54. Tubular reservoirs 70, 72, 74, 76, preferably made of a transparent material such as glass or plastic, are carried by the mounting members 60, 62, 64, 66, one reservoir on each mounting member. An applicator 78 is located within each of the reservoirs 70, 72, 74, 76 and extends down through and below the lower end of the respective reservoir. The applicators 78 are preferably made out of absorbent sponge material, such as foam plastic or foam rubber. Different coloring liquids or dyes 80 of selected colors are poured or added by means of an eye-dropper to the various reservoirs 70, 72, 74, 76. Spring means in the form of leaf springs 82 on each of the mounting members 60, 62, 64, 66 tend to urge the mounting members in a counterclockwise direction about rod 54, as viewed in FIG. 3. The lower end of each leaf spring 82 is retained by inserting it between the arm 62 and its cylindrical end portion 68, and another cross rod 86 extending between the standards 26, 28 frictionally engages the upper surface of each leaf spring 82. Self-lubricating plastic washers 88 may be provided on the rod 54 between the successive mounting members to minimize friction between their respective portions 68. At the free outer ends of each of the pivoted mounting members 60, 62, 64, 66 a colored button or plug 90 is provided for facilitating the application of manual pressure on the respective arm 60, 62, 64, 66 to swing the latter in the direction of arrow C (FIG. 3) toward the longitudinal axis of shafts 12, 14 and against the biasing force of spring means 82. The button 90 is preferably colored the same color as the particular dye or coloring liquid 80 carried in a respective reservoir 70, 72, 74, 76. Accordingly, the button 90 may be made as a peg 92 insertable into an opening in the respective arm 60, 62, 64, 66 so that the button 90 can be removed and another button of a different color inserted in its place to match a correspondingly different dye 80. The tubular reservoirs 70, 72, 74, 76 are likewise removably insertable into their mounting holes in the respective arms 60, 62, 64, 66 so that they can be replaced with reservoirs of other colored dyes.

Figure 2:
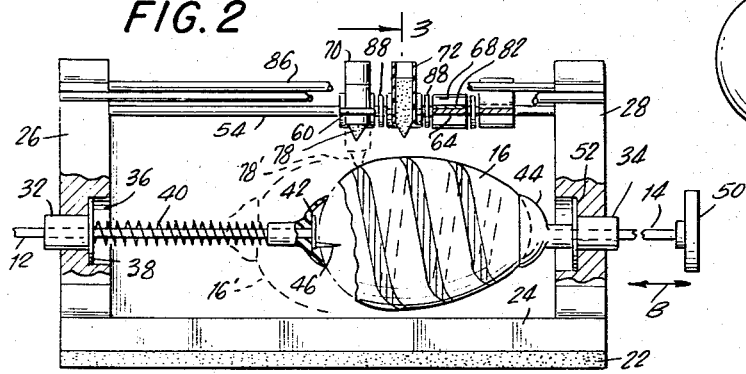
FIG. 2 is a front elevation view, partially cut away, of the device shown with an egg which has been decorated with spiral stripes.

Operation of the device is as follows: In order to produce a red spiral stripe about an egg as illustrated in FIG. 2, a red dye or coloring liquid 80 is first poured into the reservoir 70 allowed to be absorbed by the corresponding applicator 78. The knob 50 is pressed in toward the left against the pressure of spring 40 until the egg 16 is in an initial starting position 16', as indicated in dotted lines in FIG. 2. The button 90 on the particular arm 60 having the selected red dye is then pressed down until its applicator 78 is in the position shown at 78' in dotted lines in FIG. 2. The knob 50 is then slowly released against the pressure of spring 40 and the assembly 12, 16, 14 is simultaneously rotated, thus causing the applicator 78 to describe a spiral about the egg 16 as it moves from position 16' to the position 16 illustrated in solid lines in FIG. 2. By pressing down more than one of the buttons 90, spirals of a number of different colors can be simultaneously applied by the selected applicators 78. The distance between stripes of different colors can be adjusted by sliding the respective arms 60, 62, 64, 66 to a different spacing relative to one another along the rod 54. The distance between or the slope of a respective spiral of one selected color can be controlled by rotating the egg 16 more rapidly or less rapidly in relation to the longitudinal movement thereof.

Figure 4:
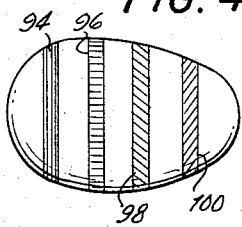
FIG. 4 illustrates an egg colored with stripes of various colors, to show one type of pattern which can be applied to an egg by the device.

In order to obtain a pattern such as that shown in FIG. 4, the buttons 90 of 4 different arms 60, 62, 64, 66 are simultaneously pressed down while the egg 16 is rotated about the longitudinal axis of shafts 12, 14. The applicators 78 on all four of the arms are all simultaneously held down while the egg is being rotated but not moved axially. Thus, as shown in FIG. 4, stripes of various colors can be applied, such as 94 of red, 96 of blue, 98 of green, and 100 of brown or yellow.

Figure 5:
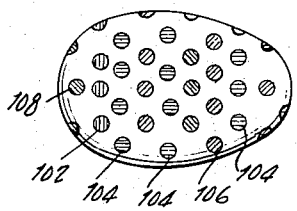
FIG. 5 illustrates an egg colored with dots of various colors applied by the device according to the invention.

To produce the dot pattern of FIG. 5, the dots are produced by momentarily pressing down a selected arm 62, allowing it to swing back by the force of spring 82, then rotating the egg about the longitudinal axis shafts 12, 14 a small amount, again momentarily applying the applicator 78 to the surface of the egg, and repeating the process until dots of one particular color have been placed wherever desired on the surface of the egg. The process is then repeated for the other applicators 78 having dyes 80 of other colors. The dots of various colors may be 102 of red, 104 of blue, 106 of brown or yellow, and 108 of green. Obviously, the colors and patterns may be varied in any desired manner by selecting one or more of the keys or buttons 90 for simultaneous or alternate pressure for varying periods, and by simultaneously or alternately rotating and axially moving the rods 12, 14.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

I claim:

1. A toy comprising a frame, a pair of axially displaceable shafts spacedly aligned along a common longitudinal axis, journalling means mounting each of said shafts in said frame for axial and rotary motion relative to said frame, holding means on said shafts for supporting an object to be decorated between said shafts, decorating means hingedly mounted on said frame and swingable toward and away from said axis for applying decorating material to said object, said decorating means including a first rod mounted in said frame parallel to said axis and a second cross rod mounted in said frame parallel to said first rod, a plurality of reservoir-supporting arms slidably and swingably mounted on said first rod, coloring liquid reservoirs carried by said arms, absorbent applicators within said reservoirs and extending outwardly therefrom, a plurality of leaf springs on said arms and resiliently slidably engaging said second rod for urging said arms away from said longitudinal axis, and selective manual means on each of said arms for causing manual pressure thereon to temporarily swing the respective arm against the force exerted by the respective leaf spring about said first rod toward said axis so as to touch a respective one of said applicators against the object to be decorated.

2. A toy according to claim 1, said shafts having mutually opposed ends, said holding means comprising a suction cup mounted on each of said opposed ends, each suction cup having a respective cupped portion facing the other cup, and a compression spring on at least one of said shafts for urging the latter axially toward the other of said shafts, said other of said shafts having a handle thereon for axial movement of said other shaft and of said object against the force of said compression spring and longitudinally relative to said decorating means and for selective simultaneous rotary motion of said object relative to said decorating means.

References Cited

UNITED STATES PATENTS

| | | | |
|---|---|---|---|
| 1,919,386 | 7/1933 | Steele | 118—219 |
| 2,167,589 | 7/1939 | Schutz | 118—219 X |
| 2,695,595 | 11/1954 | Hagerman | 118—503 X |
| 2,727,325 | 12/1955 | Jurinic | 118—500 X |
| 2,873,464 | 2/1959 | Rosenthal. | |
| 3,051,124 | 8/1962 | Schlensker et al. | 118—503 |
| 3,269,355 | 8/1966 | Tarrant | 118—219 |

CHARLES A. WILLMUTH, Primary Examiner.

R. I. SMITH, Assistant Examiner.